Oct. 2, 1923.

J. H. STALEY

MOTOR STAND

Filed March 4, 1922

1,469,734

2 Sheets-Sheet 1

Inventor,
Joseph H. Staley,
By Joseph A. Minturn.
Attorney.

Oct. 2, 1923.

J. H. STALEY 1,469,734

MOTOR STAND

Filed March 4, 1922

2 Sheets-Sheet 2

Inventor,
Joseph H. Staley,
By Joseph A. Minturn
Attorney.

Patented Oct. 2, 1923.

1,469,734

UNITED STATES PATENT OFFICE.

JOSEPH H. STALEY, OF COLUMBUS, INDIANA.

MOTOR STAND.

Application filed March 4, 1922. Serial No. 541,254.

*To all whom it may concern:*

Be it known that I, JOSEPH H. STALEY, a citizen of the United States, residing at Columbus, in the county of Bartholomew and State of Indiana, have invented new and useful Improvements in Motor Stands, of which the following is a specification.

It is desirable, in repairing motors such as are used for propelling automobiles, trucks, tractors, aeroplanes, boats and the like, to present every part for convenient access to the workman. A vast majority of motors to be repaired are used in automobiles. Formerly these were made with side flanges extending longitudinally of the motor, which could be directly bolted to parallel rails of a motor stand. But in the later development of three-point suspension motors, the flanges are often omitted, or short rear-feet are sometimes provided which will not reach the motor-stand rails; front attachments to the motor-stand often must be made from the timing gear-flange, and such a wide variety of supporting points are resorted to by the designers that direct attachment with and support by parallel rails of the motor-stand are impracticable.

The object of this invention is to provide the motor-stand with adjustable members capable of being extended to any part of a motor where supporting attachment is possible, and for securing the motor to the stand in balance so the motor may be turned and easily held in any desired or given position.

I accomplish this and other minor objects which will hereinafter appear, by the mechanism illustrated in the accompanying drawings, in which—

Figure 1:
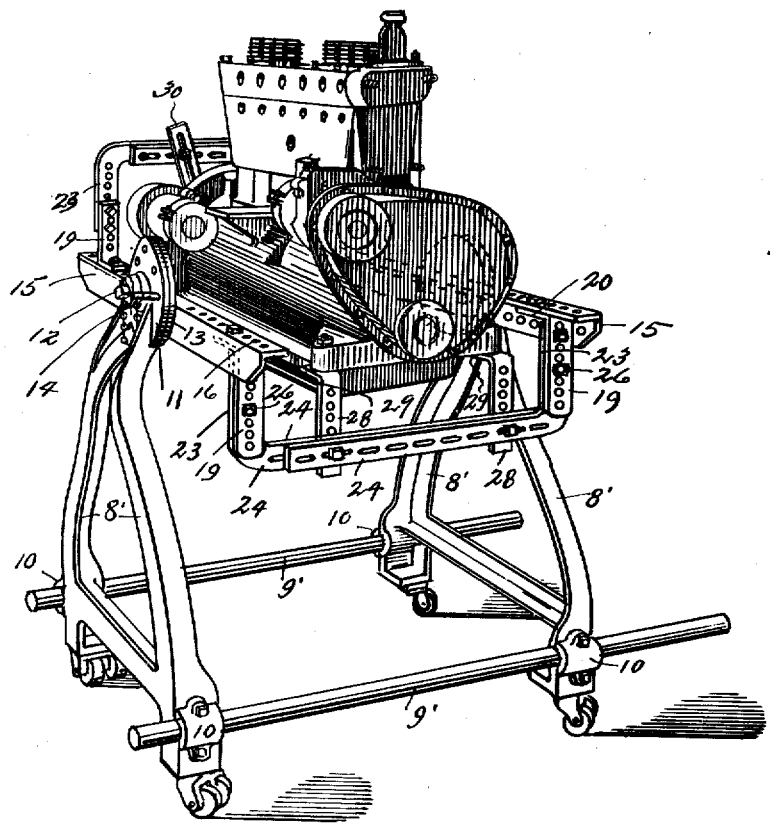
Figure 6:
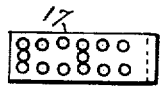
Figure 7:
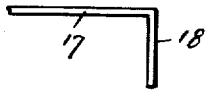
Figure 2:
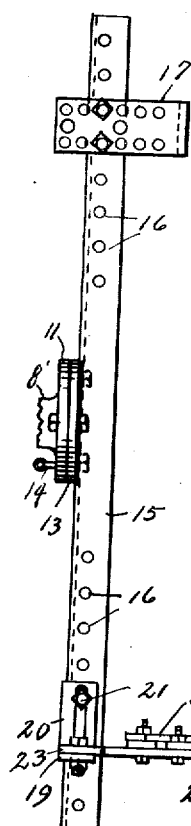
Figure 3:
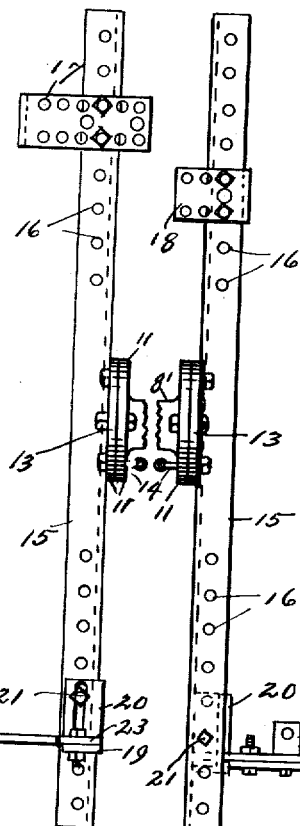
Figure 4:
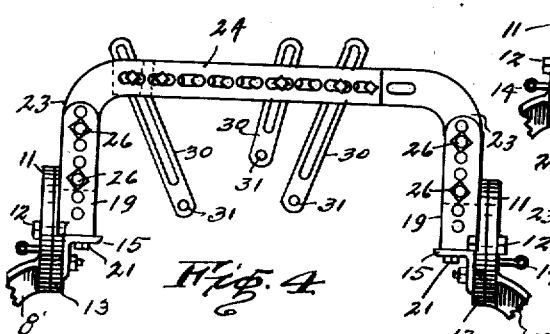
Figure 5:
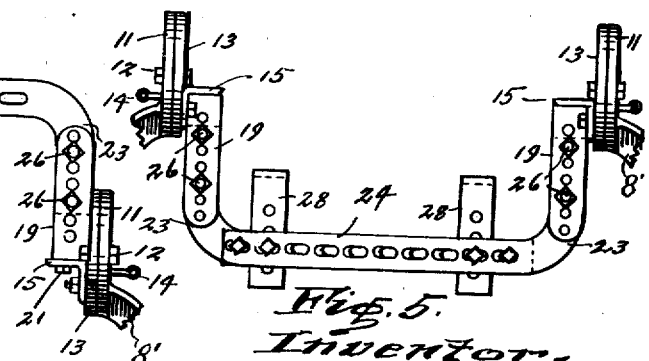

Fig. 1, is a perspective view of my improved motor-stand with motor-supporting members in operative position for holding one form of motor securely in balance. Fig. 2, is a top plan view of the side-rails and tops of standards supporting them with the universal front motor-supports and the long legs of the rear-brackets on top of the motor-stand side-rails. Fig. 3 is a like view with universal front motor-supports underneath the side-rails, and with the short leg of the bracket supports on top of the side-rails. Fig. 4, is a front end view of the structure shown in Fig. 2. Fig. 5 is a like view of the structure shown in Fig. 3. Fig. 6 is a top view of the long leg of the supporting bracket and Fig. 7 is a side view of the same.

Like characters of reference indicate like parts of the several views of the drawings.

The standards 8', 8', are broad at their bases and are connected together at their bases by a pair of parallel shafts 9', 9', which are adjustably attached by means of clamps 10, whereby the distance apart of said standard may be changed to suit the size of the motor. The standards each terminate at their upper ends in a circular plate 11, having a central hole for the passage of a bolt 12, by means of which a similar second plate 13 is held and retained in contact with the plate 11. These contacting plates have a series of holes concentric with the bolts 12 adapted to be brought into register to receive a pin 14 by means of which the plates are retained at any desired or given position of plate 13 relative to plate 11.

Bolted to the inner face of each plate 13 are the respective side-rails 15, here shown as formed out of angle steel. The bolts securing the rails to their plates pass through the vertical members of the rails and through their corresponding plates 13, and the outer member of each rail is provided with a longitudinal series of bolt-holes 16.

Usually, in three-point motor suspension, rear lugs, one on each side of the motor, are provided, but at varying heights and distances apart, and to reach them I provide brackets formed with a long leg 17, having a series of bolt-holes as shown in Figs. 2 and 6, and a short leg 18, having bolt-holes as shown in Fig. 3. These legs are here shown as at right angles to each other (see Fig. 7). This provides a wide range of adjustment on rails 15 to accommodate the varying height and distance apart of the motor-lugs, whereby the weight of the rear end of the motor may be equally balanced on the bolts 12.

For the support of the front end of the motor, where the third point of suspension frequently is made to the timing-device, and which timing-device is first removed to afford working access to the motor proper, I provide a universally adjustable support, comprising a pair of standards 19, each with a longitudinal series of bolt-holes and a foot 20 at right angles, slotted longitudinally for the passage of a bolt 21, by which the standards may be secured, either above or below, to their respective rails, depending upon the location in the particular motor of the bolt-holes for the suspension of the motor. Bolted to the standards 19 are legs 23, each of which has a leg 24 at right angles to the leg 23. The pair of legs 24 lap each other and each has a longitudinal series of slots for the passage of bolts 26 for uniting them, and these legs 24, thus united, form the support for brackets each comprising a leg 28 with a longitudinal series of bolt-holes, and a foot 29 with a hole for a bolt securing it to the motor, or the united legs form the support for bars 30, slotted longitudinally for adjustment in their attachment to the members 24. These bars have a hole 31 at their end for bolt connections with the motor.

The above described mechanism for supporting the front end of a motor may be applied below the rails 15, as shown in Figs. 2 and 4, or above said rails as shown in Figs. 3 and 5, or this mechanism may be used for the support of both ends of the motor as is shown in Fig. 1.

The adaptability and possible adjustments of my motor-stand are so obvious that further description is unnecessary, the purpose of the invention generally stated being so to support the motor between rails 15 that it will be equally balanced for all positions which it may be desired to give the motor by rotating the latter about the pivots 12, a given position of said rotation being retained by the pins 14.

While I have here described my invention in detail it is obvious that many modifications in its specific construction are possible without departing from the spirit of the invention, and I therefore do not desire to be held unduly to the forms here shown and described or any more than is required by the appended claims; and having thus described my invention, what I claim as new and wish to secure by Letters Patent, is—

1. In a motor-stand, a pair of parallel rails adjustable vertically about a common axis, means adjustable concentrically of the axis for holding a given position of the rails, and one or more brackets for each rail, each bracket comprising a pair of straight perforated members angularly disposed to each other, one of which members is attached to a rail, the other member extending inwardly from the rail to which the bracket is attached.

2. In a motor-stand, a pair of supporting members adjustable in their distance from each other, a pair of parallel rails supported by the members and vertically adjustable about a common axis, means adjustable concentrically of the axis for holding a given position of the rails, and inwardly extending brackets each comprising a pair of straight perforated members angularly disposed to each other supported by the rails and adjustable longitudinally of the rails.

3. In a motor-stand, a pair of standards adjustable in distance between them, a pair of rails supported by the standards and adjustable about a common axis, and a plurality of motor-supporting members adjustable each with the other to the varying distance between the standards and to support the motor but without interfering with the movement of the rails between the standards.

4. In a motor-stand, a pair of parallel rails adjustable about a common axis, adjustable members attached to the rails for supporting one end of a motor, other adjustable members attached to the rails on the other side of said axis, and adjustable members for supporting the other end of the motor from said last adjustable members.

5. In a motor-stand, a pair of parallel rails adjustable about a common axis, adjustable inwardly extending brackets attached to the rails for supporting one end of a motor, other members in an assembly of parts adjustable to vary the size of the assembly in a plurality of directions, adjustable means for supporting the assembly from the rails, and adjustable members for supportingly connecting the assembly with the other end of the motor.

6. In a motor-stand, a pair of parallel rails adjustable about a common axis, adjustable inwardly extending brackets attached to the rails for supporting one end of a motor, other members in an assembly of separate lapped parts on the other side of said axis adjustable relative to each other to vary the size of the assembly in a plurality of directions, means for supporting the assembly from the rails, and adjustable members for supportingly connecting the assembly with the other end of the motor.

7. In a motor-stand, a pair of parallel rails adjustable about a common axis, motor-supporting members adjustable in two directions attached to the rails for supporting one end of a motor, other members in an assembly of separate lapped parts adjustable to vary the size of the assembly and having feet parallel with and adjustably attached to the rails, and members for supporting the other end of the motor adjustably attached to said assembly.

8. In a motor-stand, a pair of rails adjustable about a common axis, adjustable means concentric with said axis for securing a given position of the rails, inwardly extending brackets adjustably secured to the rails, and motor-supporting members in an assembly of separate lapped parts comprising angle members which are supported by the rails and which are adjustable thereon, and other members adjustable therewith to vary the size of the assembly.

9. In a motor-stand, a pair of rails adjustable about a common axis each of said rails having a plurality of flanges, means adjustable concentrically of the axis for locking the rails, inwardly extending brackets adjustably secured to one of the flanges of the rails, and motor-supporting bars each having a plurality of angularly disposed members at different lengths attached to the other flanges of the rails and adjustable each with the other to suit the position of the motor.

10. In motor-stand, a pair of supporting parts, a pair of members rotatively pivoted respectively beside the first parts, a pair of rails fastened to the rotatable members, means for fastening the parts and members together to arrest rotation, other members in a plurality of longitudinally adjustable parts connecting the rails together, and motor-supports from said last members.

11. In a motor-stand, a pair of supporting members, a rotatable member pivoted to each of said supporting members, a pair of rails fastened to the rotatable member, pin means for fastening the said members together to arrest rotation, a plurality of longitudinally adjustable and overlapping bars connecting the two rails, means for fastening the bars at their overlaps, and motor-supports from the bars.

12. In a motor-stand, a pair of parallel rails adjustable about a common axis, means to hold a given adjustment of the rails, a connection between the two rails comprising a bar at right angles to each rail having a longitudinal series of holes, means for securing the bars to either side of said rails at different distances from the axis of rotation of the rails, a pair of bars substantially L-shape having legs with a series of longitudinal openings, one leg of each L-shaped bar overlapping a corresponding leg of the other bar, and the other leg of each L-shaped bar overlapping said respective bar attached to the parallel rails, means for securing the overlapped members of said bars together, and motor-supports from the L-shaped bars.

Signed at Columbus, Indiana, this the 28th day of Feb. 1922.

JOSEPH H. STALEY.